United States Patent
Hattori et al.

(10) Patent No.: US 7,247,251 B2
(45) Date of Patent: Jul. 24, 2007

(54) METHOD FOR MANUFACTURING A MAGNETIC RECORDING MEDIUM

(75) Inventors: Kazuhiro Hattori, Chuo-ku (JP); Shuichi Okawa, Chuo-ku (JP); Takahiro Suwa, Chuo-ku (JP); Mikiharu Hibi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 14 days.

(21) Appl. No.: 11/050,769

(22) Filed: Feb. 7, 2005

(65) Prior Publication Data
US 2005/0186356 A1 Aug. 25, 2005

(30) Foreign Application Priority Data
Feb. 23, 2004 (JP) ............................. 2004-046925

(51) Int. Cl.
*H01F 1/00* (2006.01)
(52) U.S. Cl. ...................... 216/22; 216/38; 216/66; 216/72
(58) Field of Classification Search ................ None
See application file for complete search history.

(56) References Cited

U.S. PATENT DOCUMENTS

| | | | |
|---|---|---|---|
| 5,530,608 A * | 6/1996 | Aboaf et al. ............... 360/316 |
| 6,014,296 A | 1/2000 | Ichihara et al. |
| 6,379,570 B1 * | 4/2002 | Fatula et al. .................. 216/22 |
| 6,602,620 B1 * | 8/2003 | Kikitsu et al. ............ 428/842.2 |
| 6,689,622 B1 * | 2/2004 | Drewes ......................... 438/3 |
| 6,748,865 B2 * | 6/2004 | Sakurai et al. .............. 101/483 |
| 6,764,738 B1 * | 7/2004 | Wu et al. ................. 428/831.2 |
| 2002/0088947 A1 * | 7/2002 | Morgan ...................... 250/492.3 |
| 2004/0071951 A1 * | 4/2004 | Jin ............................. 428/323 |
| 2005/0086795 A1 * | 4/2005 | Suwa et al. .............. 29/603.01 |
| 2005/0181239 A1 * | 8/2005 | Ma et al. ..................... 428/835 |
| 2005/0221512 A1 * | 10/2005 | Ito et al. ........................ 438/3 |

FOREIGN PATENT DOCUMENTS

JP A 09-97419 4/1997

* cited by examiner

*Primary Examiner*—Allen Olsen
(74) *Attorney, Agent, or Firm*—Oliff & Berridge, PLC

(57) ABSTRACT

A method for manufacturing a magnetic recording medium is provided, which can efficiently manufacture a magnetic recording medium that includes a recording layer formed in a concavo-convex pattern, has a sufficiently flat surface, and provides good recording and reproduction precision. The method includes: a non-magnetic material filling step of depositing a non-magnetic material over a recording layer formed in a predetermined concavo-convex pattern over a substrate, thereby filling a concave portion of the concavo-convex pattern with the non-magnetic material; and a flattening step of removing the excess part of the non-magnetic material above the recording layer by ion beam etching to flatten the surfaces of the non-magnetic layer and the recording layer.

5 Claims, 6 Drawing Sheets

METHOD FOR MANUFACTURING A MAGNETIC RECORDING MEDIUM

BACKGROUND OF THE INVENTION

1. Field of the Invention

The present invention relates to a method for manufacturing a magnetic recording medium including a recording layer formed in a concavo-convex pattern.

2. Description of the Related Art

Conventionally, in a magnetic recording medium such as a hard disc, areal density has been largely improved by various types of development such as miniaturization of magnetic particles forming a recording layer, change of the material for the recording layer, and miniaturization of head processing. The further improvement of the areal density continues to be expected.

However, many problems including the limitation of the head processing, erroneous writing of data on adjacent tracks caused by spreading magnetic fields of the recording head, crosstalk, and the like are made apparent. Thus, the improvement of the areal density by the conventional development approach has reached the limit. Therefore, as candidates of a magnetic recording medium that enables further improvement of the areal density, a magnetic recording medium such as a discrete track medium or a patterned medium, in which a recording layer is formed in a predetermined concavo-convex pattern, has been proposed (see Japanese Patent Laid-Open Publication No. Hei 9-97419, for example).

On the other hand, when the surface of the medium is formed in a concavo-convex pattern, the flying height of a head slider may be unstable, thus degrading the recording and reproduction characteristics. Therefore, it is necessary to flatten the surface of the medium by depositing a non-magnetic material over the recording layer of the concavo-convex pattern to fill concave portions and then removing the excess part of the non-magnetic material above the recording layer.

As a technique for processing a recording layer in a concavo-convex pattern, dry etching can be used. As a technique for depositing a non-magnetic material, a deposition technique used in the art of semiconductor manufacturing, such as sputtering, can be used. In addition, as a technique for removing the excess part of the non-magnetic material above the recording layer to flatten the surface, a process technique used in the art of semiconductor manufacturing, such as CMP (Chemical Mechanical Polishing), can be used.

However, in the case of using CMP, it is difficult to precisely control the processed amount (thickness) on the order of several nanometers, for example, within a range of from about 1 to about 2 nm. Thus, the processing may not be performed sufficiently and therefore the non-magnetic material is left on the recording layer, or the processing may be performed excessively so as to remove a part of the recording layer. This degrades the magnetic characteristics of the recording layer.

Moreover, in the case of using CMP, slurry may react with the recording layer, thus degrading the magnetic characteristics of the recording layer. In addition, in the case of using CMP, cleaning and the like take large amount of time and cost in order to remove the slurry.

Furthermore, when CMP is combined with a dry process such as a process for processing the recording layer, transfer of an object to be processed and the like become complicated because CMP is a wet process. Thus, in this case, efficiency of the whole manufacturing process is lowered.

SUMMARY OF THE INVENTION

In view of the foregoing problems, various exemplary embodiments of this invention provide a method for manufacturing a magnetic recording medium, which can efficiently manufacture a magnetic recording medium that includes a recording layer formed in a concavo-convex pattern, has a sufficiently flat surface, and provides good recording and reproduction precision.

The present invention achieves the above object by using ion beam etching, which enables easier control of the processed amount than CMP, in a process for removing the excess part of the non-magnetic material above a recording layer to flatten the surfaces of the recording layer and the non-magnetic material. According to various exemplary embodiments of the present invention, it is possible to suppress the processing of the recording layer in the flattening step. Moreover, by using ion beam etching that is a dry process, instead of a wet process such as CMP, the need of cleaning of slurry and the like can be eliminated. In addition, the efficiency of the whole manufacturing process of a magnetic recording medium can be improved when ion beam etching is combined with another dry process.

Furthermore, ion beam etching tends to selectively remove a projecting portion of a film to be processed faster than other portions thereof. Thus, a high flattening effect can be achieved.

However, even in the case of using ion beam etching, if complete removal of the non-magnetic material above the recording layer is tried, a part of the recording layer may be removed together with the non-magnetic material.

In order to prevent this, the inventors of the present invention tried to form an etching stop film having a lower etching rate with respect to ion beam etching than that of the non-magnetic material, on the recording layer. Such formation of the etching stop film enabled the non-magnetic material above the recording layer to be completely removed while preventing removal of the recording layer. However, addition of a process for forming the etching stop film lowered productivity. In addition, since the etching stop film was left on the recording layer, the sensitivity of recording and reproduction was lowered in some cases.

Therefore, the inventors of the present invention have studied earnestly and found that, by setting etching conditions such as an incident angle of ion beams and the type of processing gas in an appropriate manner, the etching rate of the recording layer could be made lower than the etching rate of the non-magnetic material, so that the excess part of the non-magnetic material could be removed while the processed amount of the recording layer was suppressed to approximately 1 nm or less.

Accordingly, various exemplary embodiments of the invention provide a method for manufacturing a magnetic recording medium, comprising a non-magnetic material filling step of depositing a non-magnetic material over a recording layer formed in a predetermined concavo-convex pattern over a substrate to fill a concave portion of the concavo-convex pattern with the non-magnetic material; and a flattening step of removing an excess part of the non-magnetic material above the recording layer by ion beam etching to flatten surfaces of the non-magnetic material and the recording layer.

In the present application, the term "recording layer formed in a concavo-convex pattern" is used to mean not only a recording layer divided into a number of recording elements but also a recording layer that is partially divided to leave a part of the recording layer continuous, a recording layer continuously formed over a part of a substrate, such as a spiral recording layer, and a continuous recording layer in which both a convex portion and a concave portion are formed.

In the present application, the term "excess part of the non-magnetic material" is used to mean a non-magnetic material located above the upper surface of the recording layer (i.e., on the opposite side of the recording layer to the substrate).

In the present application, the term "ion beam etching" is used to collectively mean processing methods that irradiate an object to be processed with ionized gas so as to remove the object to be processed, such as ion milling.

In the present application, the term "incident angle of ion beams" is used to mean an angle at which ion beams are incident on the surface of the object to be processed and an angle formed by the surface of the object to be processed and an average irradiation direction of the ion beams. For example, the incident angle is 0° when the central axis of the ion beams is parallel to the surface of the object to be processed, and the incident angle is +90° when the central axis of the ion beams is perpendicular to the surface of the object to be processed.

In the present application, the term "etching rate" is used to mean the amount processed by etching per unit time.

In the present application, the term "magnetic recording medium" is not limited to a hard disc, a floppy (registered trademark) disc, a magnetic tape, and the like, which use only magnetism for recording and reproducing information. This term is used to mean not only the above-listed media but also a magneto optical recording medium such as an MO (Magneto Optical), which uses magnetism and light, and a heat-assisted recording medium which uses magnetism and heat.

According to various exemplary embodiments of the present invention, the use of ion beam etching can suppress the processing of the recording layer in the flattening step. Moreover, by restricting the incident angle of ion beams to be in a predetermined range or using halogen(or halide) gas as a processing gas of ion beam etching, it is possible to selectively remove the non-magnetic material while suppressing the removal of the recording layer. Thus, degradation of the magnetic characteristics of the recording layer can be prevented. In addition, the use of ion beam etching that is a dry process can eliminate the need of cleaning of slurry and the like, and can improve the efficiency of the whole manufacturing process when ion beam etching is combined with another dry process. Furthermore, by using ion beam etching, it is possible to flatten a film to be processed while selectively removing a projecting portion of the film to be processed faster than other portions thereof. Thus, a high flattening effect can be obtained.

DETAILED DESCRIPTION OF THE PREFERRED EMBODIMENT

Various exemplary embodiments of this invention will be hereinafter described in detail with reference to the drawings.

Figure 1:
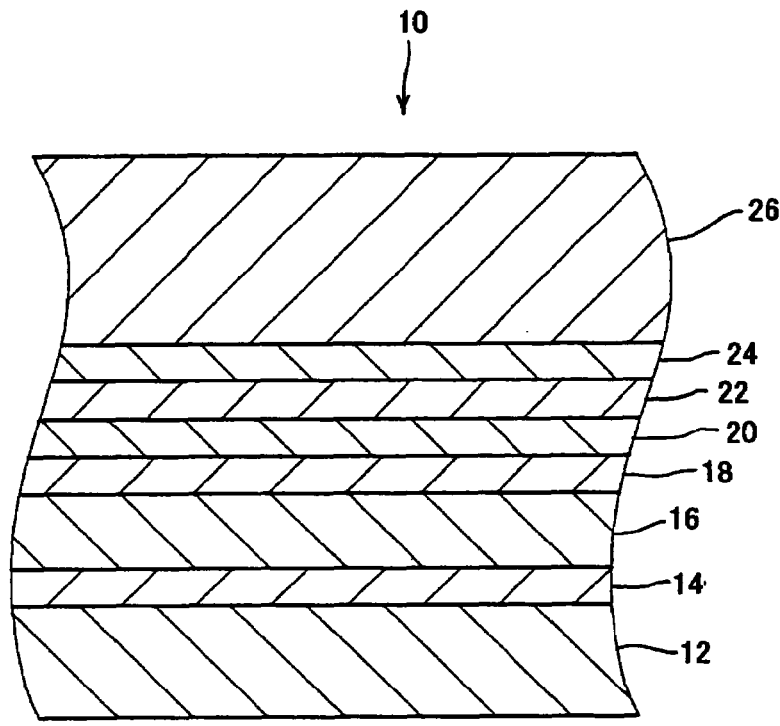
FIG. 1 is a side cross-sectional view schematically showing a starting body of an object to be processed according to a first exemplary embodiment of the present invention.
Figure 2:
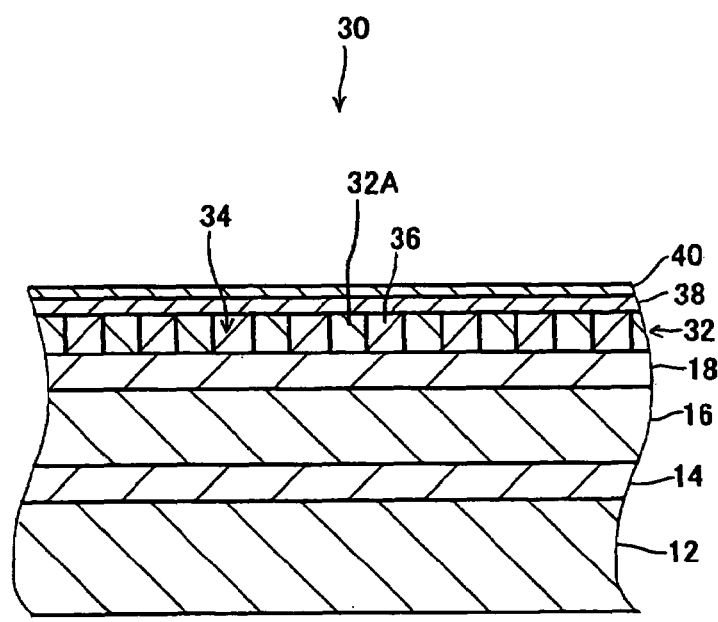
FIG. 2 is a side cross-sectional view schematically showing a structure of a magnetic recording medium obtained by processing the object to be processed.

A first exemplary embodiment of the present invention relates to a method for manufacturing a magnetic recording medium shown in FIG. 2 by processing a starting body of an object to be processed in which a continuous recording layer and the like are formed, as shown in FIG. 1, so as to divide the continuous recording layer into a number of recording elements in a predetermined concavo-convex pattern and fill concave portions between the recording elements (i.e., concave portions in the concavo-convex pattern) with non-magnetic material. This method has features in a non-magnetic material filling step and a flattening step. The other steps do not seem so important to understand this exemplary embodiment. Therefore, the description of them is omitted in an appropriate manner.

As shown in FIG. 1, the starting body of the object to be processed 10 includes a glass substrate 12, and an underlayer 14, a soft magnetic layer 16, a seed layer 18, a continuous recording layer 20, a first mask layer 22, a second mask layer 24, and a resist layer 26 formed over the glass substrate 12 in that order.

The underlayer 14 is 30 to 200 nm in thickness and made of Ta (tantalum), Cr (chromium) or a Cr alloy. The soft magnetic layer 16 is 50 to 300 nm in thickness and made of an Fe (iron) alloy or a Co (cobalt) alloy. The seed layer 18 is 3 to 30 nm in thickness and made of Cr, a CoCr alloy that is non magnetic, Ti (titanium), MgO (magnesium oxide), or the like. The continuous recording layer 20 is 5 to 30 nm in thickness and is made of a CoCr (cobalt-chromium) alloy. The first mask layer 22 is 3 to 50 nm in thickness and made of TiN (titanium nitride).

The second mask layer 24 is 3 to 30 nm in thickness and is made of Ni (nickel). The resist layer 26 is 30 to 300 nm in thickness and made of a negative resist (NBE22A manufactured by Sumitomo Chemical Co., Ltd.).

As shown in FIG. 2, a magnetic recording medium 30 is a discrete truck type magnetic disc of a perpendicular recording system. In the magnetic recording medium 30, a recording layer 32 is formed in a concavo-convex pattern obtained by dividing the aforementioned continuous recording layer 20 into a number of recording elements 32A at fine intervals. More specifically, in a data area of the magnetic recording medium 30, the recording elements 32A are formed concentrically at fine intervals in a radial direction of tracks. In a servo region, the recording elements 32A are formed in a pattern of predetermined servo information and the like. Concave portions 34 between the recording elements 32A are filled with a non-magnetic material 36. Over the recording elements 32A and the non-magnetic material 36, a protection layer 38 and a lubricating layer 40 are formed in that order.

The non-magnetic material 36 is made of $SiO_2$ (silicon dioxide) The protection layer 38 is 1 to 5 nm in thickness and made of a hard carbon film called as diamond like carbon. In the present application, the term "diamond like carbon" (hereinafter, simply referred to as "DLC") is used to mean a material that is mainly composed of carbon, has an amorphous structure, and has Vickers hardness of about 200 to about 8000 $kgf/mm^2$. The lubricating layer 40 is 1 to 2 nm in thickness and made of PEPE (perfluoro polyether).

Figure 3:
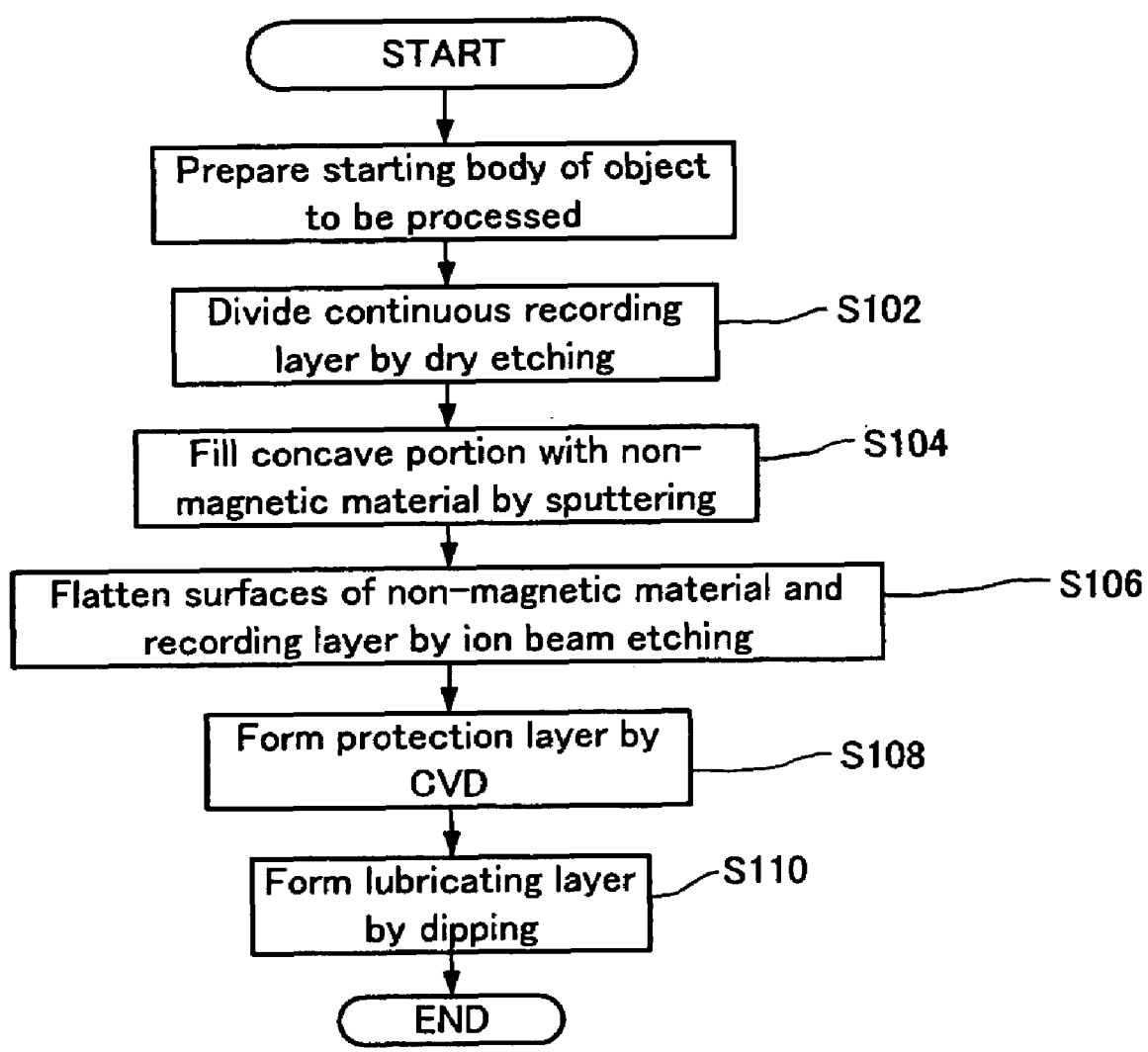
FIG. 3 is a flowchart showing the outline of a method for manufacturing the magnetic recording medium.

Next, a method for processing the object to be processed 10 will be described based on a flowchart of FIG. 3.

First, the starting body of the object to be processed 10 shown in FIG. 1 is processed, thereby dividing the continuous recording layer 20 into the recording elements 32A. Thus, the recording layer 32 is formed (S102).

More specifically, the starting body of the object to be processed 10 is obtained by forming the underlayer 14, the soft magnetic layer 16, the seed layer 18, the continuous recording layer 20, the first mask layer 22, and the second mask layer 24 over the glass substrate 12 in that order by sputtering, and then applying the resist layer 26 by spin-coating. Alternatively, the resist layer 26 may be applied by dipping.

Then, by nano-imprinting using a transfer device (not shown), a predetermined servo pattern including contact holes is transferred to the resist layer 26 of the aforementioned starting body of the object to be processed 10 in the servo area, and a concavo-convex pattern including concave portions and convex portions at fine intervals in the radial direction is transferred onto the resist layer 26 in the data area. Then, the resist layer 26 of the bottom portion of the concave portion of the concavo-convex pattern is removed by reactive ion etching using $O_2$ gas or the like as reactive gas. Alternatively, the resist layer 26 maybe processed by performing exposure and development for the resist layer 26.

Figure 4:
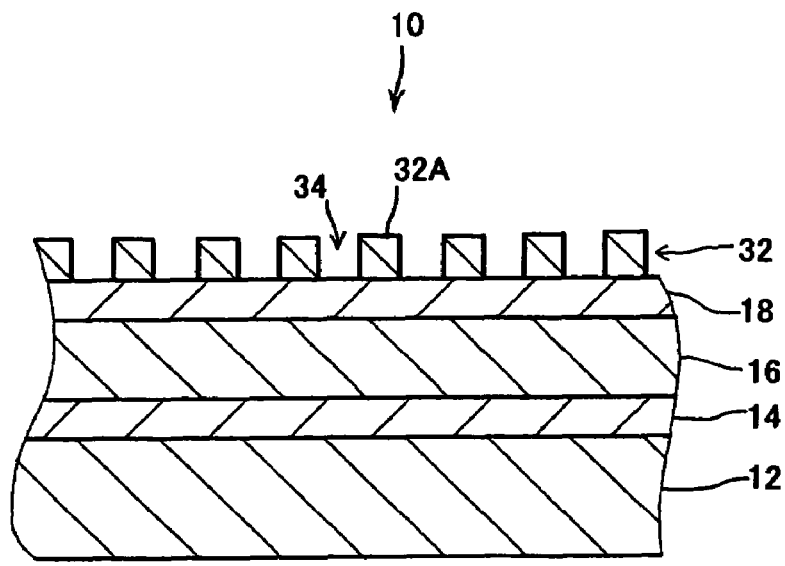
FIG. 4 is a side cross-sectional view schematically showing the shape of the object to be processed in which recording elements are formed on its surface.

Next, the second mask layer 24 of the bottom portion of the concave portion is removed by ion beam etching using Ar (argon) gas, and then the first mask layer 22 of the bottom portion of the concave portion is removed by reactive ion etching using $SF_6$ (sulfur hexafluoride) gas. As a result, the continuous recording layer 20 is exposed at the bottom portion of the concave portion. Then, the continuous recording layer 20 of the bottom portion of the concave portion is removed by reactive ion etching using CO gas and $NH_3$ gas as reactive gas. In this manner, the continuous recording layer 20 is divided into a number of recording elements 32A and the recording layer 32 is formed. Then, the first mask layer 22 remaining on the upper surface of the recording elements 32A is completely removed by reactive ion etching using $SF_6$ gas as reactive gas. As a result, the object to be processed 10 having the structure shown in FIG. 4, in which the recording layer 32 of the concavo-convex pattern has been formed on its surface, is obtained.

Figure 5:
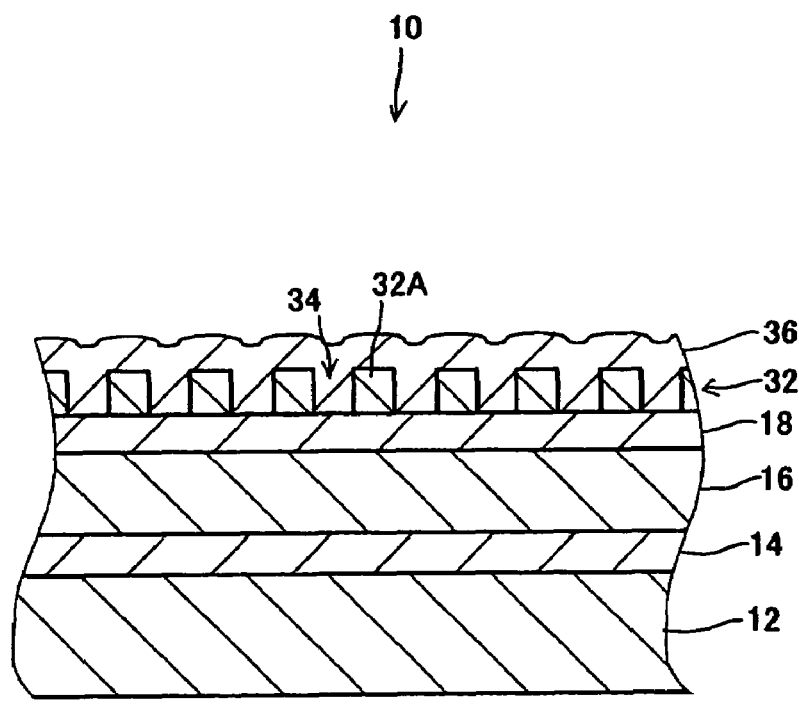
FIG. 5 is a side cross-sectional view schematically showing the shape of the object to be processed in which a non-magnetic material is deposited over the recording elements and concave portions are filled with the non-magnetic material.

Then, as shown in FIG. 5, particles of $SiO_2$ (non-magnetic material 36) are deposited on the surface of the object to be processed 10 by bias sputtering which applies a bias power to the object to be processed 10, thereby filling the concave portions 34 between the recording elements 32A with the non-magnetic material 36 (S104). The non-magnetic material 36 is deposited to completely coat the recording elements 32A.

In this deposition, the surface of the deposited non-magnetic material 36 tends to have a concavo-convex shape, because $SiO_2$ particles are scattered from $SiO_2$ target by collision of sputtering gas such as Ar with $SiO_2$ target and try to be deposited uniformly on the surface of the object to be processed 10 in a pattern following the concavo-convex shape of the recording elements.

On the other hand, by applying the bias power to the object to be processed 10, the sputtering gas is biased toward the object to be processed 10 and collides with the deposited layer of $SiO_2$, so that a part of the deposited $SiO_2$ layer is etched. This etching action tends to selectively remove a projecting portion of the deposited $SiO_2$ faster than other portions. Therefore, the concavo-convex pattern of the surface of the non-magnetic material 36 is gradually leveled off. In fact, those actions progress simultaneously. Because the depositing action occurs more than the etching action, the concavo-convex pattern of the surface is suppressed to be small and the deposition of the non-magnetic material 36 progresses.

Thus, the non-magnetic material 36 is deposited in a shape in which the concavo-convex pattern of the surface is suppressed, as shown in FIG. 5.

Figure 6:
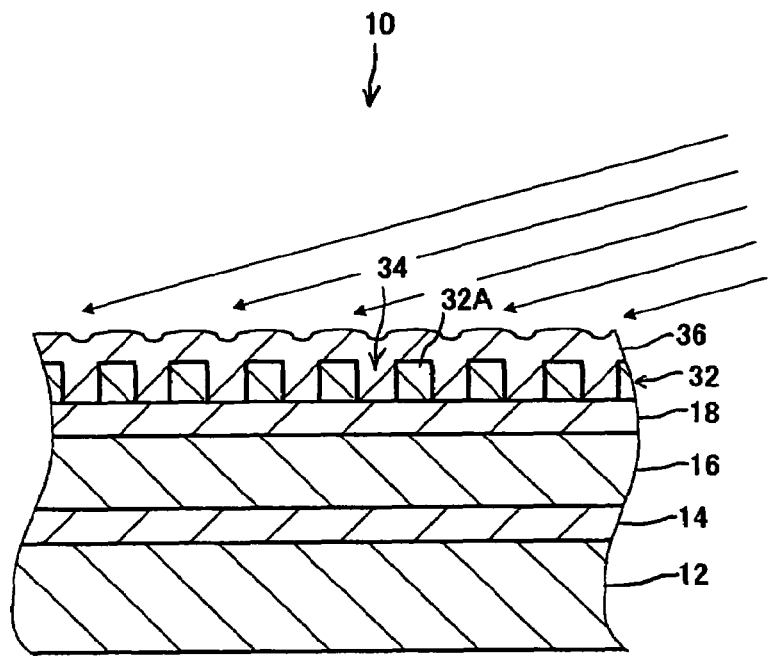
FIG. 6 is a side cross-sectional view schematically showing a flattening step of the object to be processed.

Next, as shown in FIG. 6, the non-magnetic material 36 is removed to the upper surface of the recording elements 32A by ion beam etching, thereby flattening the surfaces of the recording elements 32A and the non-magnetic material 36 (S106). In this ion beam etching, Ar gas is used as the processing gas and an incident angle of ion beams is restricted within a range of from $-10°$ to $+55°$. Under those conditions, the non-magnetic material 36 is removed to the upper surface of the recording elements 32A. By tilting the incident direction of the ion beams from the direction perpendicular to the surface in the aforementioned manner, the effect of leveling off the concavo-convex pattern can be enhanced. In order to further enhance the effect of leveling off the concavo-convex pattern, it is preferable that the incident angle of ion beams be restricted within a range of from $-10°$ to $+30°$.

Figure 7:
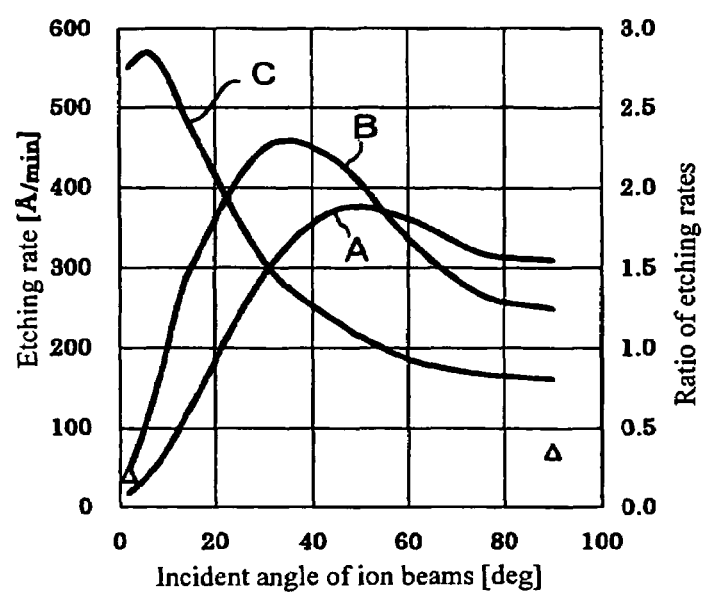
FIG. 7 is a graph showing relationships between an incident angle of ion beams and etching rates in the case where Ar gas is used as processing gas in the flattening step.

Moreover, by restricting the incident angle of ion beams to fall within the aforementioned range, an etching rate of CoCr alloy (recording layer 32) shown with the reference symbol A in FIG. 7 becomes lower than that of $SiO_2$ (non-magnetic material 36) shown with the reference symbol B in FIG. 7. In accordance with this, the processed amount of the recording element 32A can be suppressed. Please note that a curve labeled with the reference symbol C in FIG. 7 represents a ratio of the etching rates that is obtained by dividing the etching rate of $SiO_2$ (non-magnetic material 36) by that of CoCr alloy (recording layer 32). Especially, when the incident angle of ion beams is restricted to be $+10°$ or less, the ratio of the etching rates becomes significantly large, and it is possible to selectively remove the non-magnetic material 36 while surely suppressing the processed amount of the recording elements 32A to about 1 nm or less. Thus, this mode is preferable.

Please note that it is possible to perform the processing even when the incident angle of ion beams is in a negative range (−10° to 0°). This is because the incident angle of a part of ion beams is probably in a positive range even if an average incident angle of ion beams is in a negative range.

Figure 8:
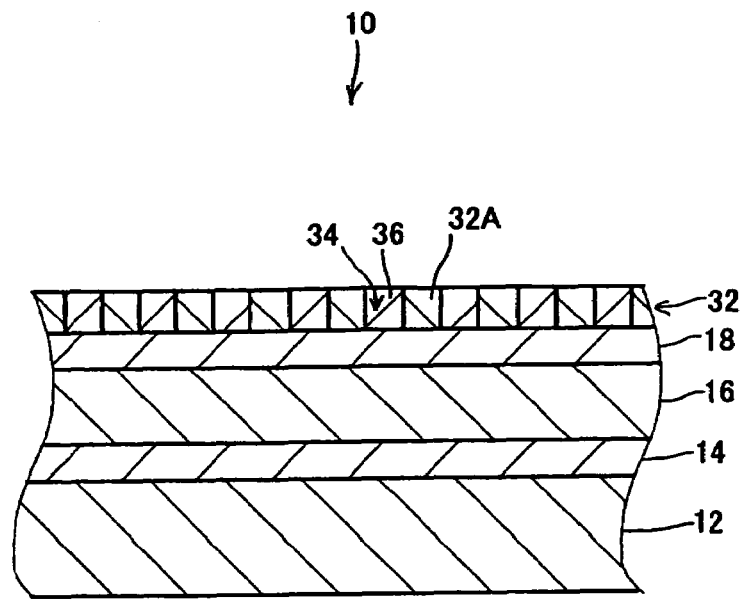
FIG. 8 is a side cross-sectional view schematically showing the shape of the object to be processed after the flattening step.

Thus, while degradation of the magnetic characteristics of the recording elements 32A is suppressed, it is possible to remove the excess part of the non-magnetic material 36 to the upper surface of the recording elements 32A and sufficiently flatten the upper surfaces of the non-magnetic material 36 and the recording elements 32A, as shown in FIG. 8.

The non-magnetic material 36 is deposited so as to have a suppressed concavo-convex pattern on its surface by application of a bias power in the non-magnetic material filling step (S104). This makes the flattening easier.

Figure 9:
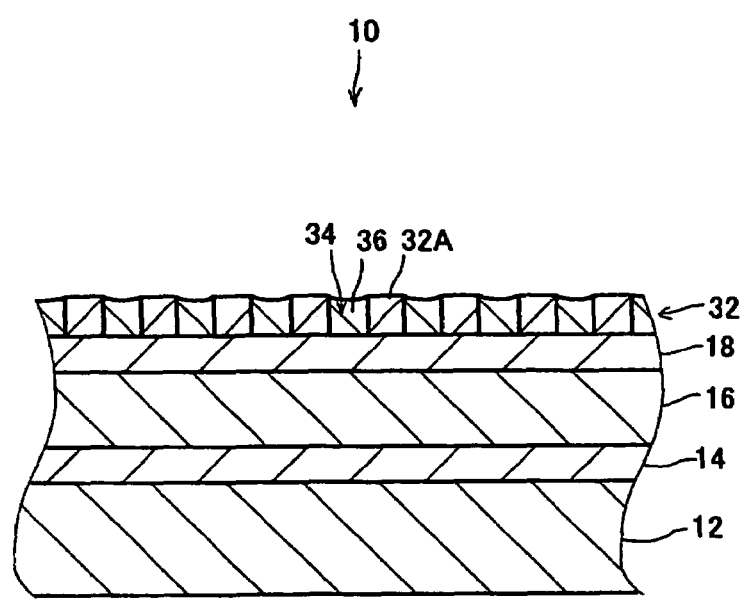
FIG. 9 is a side cross-sectional view schematically showing another exemplary shape of the object to be processed after the flattening step.

Moreover, as shown in FIG. 9, even in the case where the non-magnetic material 36 is excessively removed to a slightly lower level than the upper surface of the recording elements 32A, the processed amount of the recording elements 32A can be suppressed to be small because the etching rate of the recording layer 32 is lower than that of the non-magnetic material 36. Thus, degradation of the magnetic characteristics of the recording elements 32A can be suppressed. In addition, since the recording elements 32A protrude over the non-magnetic material 36, the sensitivity of the recording and reproduction cannot be lowered.

Next, the protection layer 38 is formed on the upper surfaces of the recording elements 32A and the non-magnetic material 36 by CVD (Chemical Vapor Deposition) (S108). Then, the material for the lubricating layer 40 is applied on the protection layer 38 by dipping (S110). In this manner, the magnetic recording medium 30 shown in FIG. 2 is completed.

As described above, the surfaces of the recording elements 32A and the non-magnetic material 36 can be sufficiently flattened to a desired level by depositing the non-magnetic material 36 while suppressing the concavo-convex pattern on its surface by applying a bias power, and then flattening the surfaces of the recording elements 32A and the non-magnetic material 36 by ion beam etching. Also, the surface of the lubricating layer 40 can be sufficiently flattened to a desired level. Therefore, a stable flying property of a head slider can be obtained.

Moreover, by restricting the incident angle of ion beams to be in a range of from −10° to +55° and making the etching rate of CoCr alloy (recording layer 32) lower than that of $SiO_2$ (non-magnetic material 36) in the flattening step (S106), the removal of the recording layer 32 and degradation of the magnetic characteristics of the recording layer 32 can be suppressed.

In the first exemplary embodiment, the non-magnetic material 36 is deposited by sputtering. Alternatively, the non-magnetic material 36 may be deposited by other deposition methods, for example, ion beam deposition. In this case, the effect of suppressing concavo-convex pattern of the surface can also be achieved by applying a bias power. On the other hand, if the surface of the non-magnetic material 36 can be flattened sufficiently in the flattening step (S106), the non-magnetic material 36 may be deposited without applying the bias power.

Moreover, in the first exemplary embodiment, ion beam etching in the flattening step (S106) uses Ar gas as the processing gas. Alternatively, ion beam etching using another rare gas such as Kr (krypton) or Xe (xenon) may be employed.

In the first exemplary embodiment, the incident angle of ion beams is restricted within a range of from −10° to +55°. However, in the case where the incident angle of ion beams is set to be larger than +55° (and less than 90°), the use of ion beam etching also makes the control of the processed amount easier than the use of CMP, and provides the effect of improving the production efficiency when ion beam etching is combined with another dry process.

Next, a second exemplary embodiment of the present invention is described.

In the second exemplary embodiment, $C_2F_6$ gas is used as the processing gas of ion beam etching in the flattening step (S106), unlike the first exemplary embodiment. The other steps are the same as those in the first exemplary embodiment and therefore the description thereof is omitted.

Figure 10:
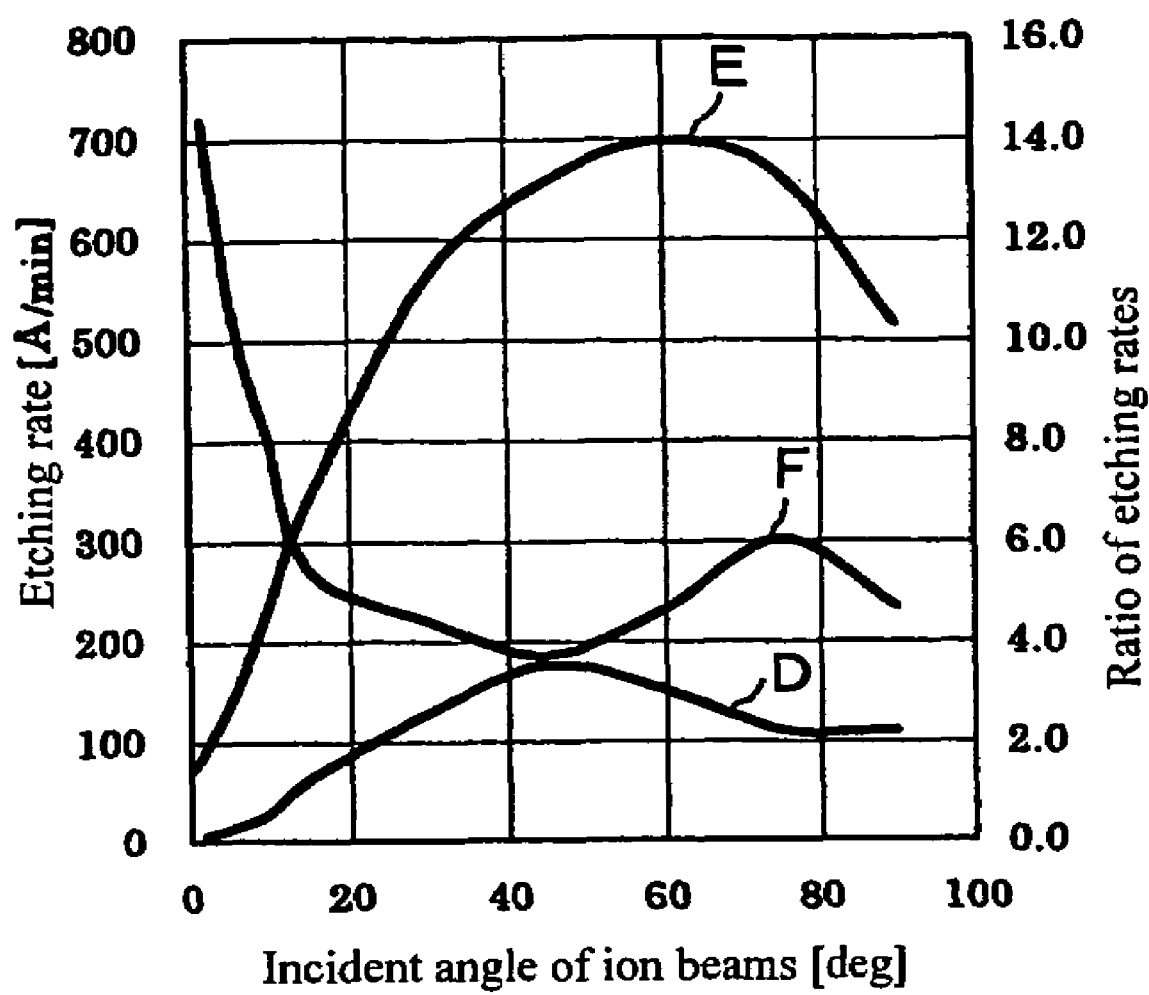
FIG. 10 is a graph showing relationship between the incident angle of ion beams and the etching rates in the case where $C_2F_6$ gas is used as the processing gas in a second exemplary embodiment of the present invention.

In the case where $C_2F_6$ (hexafluoroethane) gas is used as the processing gas of ion beam etching, for example, the etching rate of CoCr alloy (recording layer 32) is lower than that in the case of using Ar gas, as shown with curve D in FIG. 10, when the incident angles of ion beams in both cases are the same. In accordance with this, the removal of the recording layer 32 is suppressed. Moreover, when $C_2F_6$ gas is used, $C_2F_6$ gas chemically reacts with $SiO_2$ so as to make $SiO_2$ brittle. Thus, the etching rate of $SiO_2$ (non-magnetic material 36) can be made higher, as shown with the curve E in FIG. 10, so that the surface of the non-magnetic material 36 and the recording elements 32A can be flattened efficiently. In addition, irrespective of the incident angle of ion beams, the etching rate of CoCr alloy (recording layer 32) can be made lower than that of $SiO_2$ (non-magnetic material 36). Furthermore, when the incident angle of ion beams is restricted to +10° or less, as in the case of using Ar gas, a etching rate ratio that is obtained by dividing the etching rate of $SiO_2$ (non-magnetic material 36) by that of CoCr alloy (recording layer 32) becomes significantly large, as shown with the curve F in FIG. 10. Therefore, the effect of protecting the recording layer 32 can be enhanced in this range and this range is preferable.

In the second exemplary embodiment, $C_2F_6$ gas is used as the processing gas of ion beam etching. However, in the case of using another halogen or halide gas such as $SF_6$ (sulfur hexafluoride) or $CF_4$ (carbon tetrafluoride), the inventors of the present invention confirmed that the same effects as those obtained in the case of using $C_2F_6$ gas were obtained. As halogen or halide gas, other than fluorinated gas, chlorine or chlorinated gas can be used. From a viewpoint of easiness of cleaning of the remaining processing gas, it is preferable to use fluorine or fluorinated gas.

Moreover, in the first and second exemplary embodiments, the first mask layer 22, the second mask layer 24, and the resist layer 26 are formed over the continuous recording layer 20, and the recording layer 20 is divided by three-step dry etching. However, the materials for the resist layer and the mask layer, the number of layers, the thickness, the type of dry etching, and the like are not limited specifically, as long as the continuous recording layer 20 can be divided in desired concavo-convex pattern.

In the first and second exemplary embodiments, the material for the recording layer 32 (continuous recording layer 20) is a CoCr alloy. However, the present invention can be applied to processing of a magnetic recording medium including recording elements formed of another material such as another type of alloy containing an iron group element (Co, Fe (iron), Ni) or a layered structure of those elements, for example.

In the first and second exemplary embodiments, the non-magnetic material 36 is $SiO_2$. Alternatively, other non-magnetic material, for example other oxide, other nitride such as TiN (titanium nitride), Ta (tantalum), TaSi, or Si may be used.

In the first and second exemplary embodiments, the underlayer 14, the soft magnetic layer 16, and the seed layer 18 are formed under the continuous recording layer 20. However, the structure under the continuous recording layer 20 may be appropriately changed depending on the type of the magnetic recording medium. For example, one or two of the underlayer 14, the soft magnetic layer 16, and the seed layer 18 may be omitted. Moreover, each of the above layers may be formed by a plurality of layers. Alternatively, the continuous recording layer may be formed directly on the substrate.

In the first and second exemplary embodiments, the magnetic recording medium 30 is a discrete track type magnetic disc of a perpendicular recording type in which the recording elements 32A are arranged side by side at fine intervals in the track-radial direction in the data area. However, the present invention can be also applied to manufacturing of a magnetic disc including recording elements arranged side by side at fine intervals in the track-circumferential direction (sector direction), a magnetic disc including recording elements arranged side by side at fine intervals in the track-radial direction and the track-circumferential direction, a PERM (pre-embossed recording medium) type magnetic disc including a continuous recording layer in which a concavo-convex pattern is formed, and a magnetic disc in which a track is formed spirally. Moreover, the present invention can also be applied to manufacturing of a magneto-optical disc such as an MO, a heat-assisted type magnetic disc which uses magnetism and heat, and another magnetic recording medium which includes a recording layer of a concavo-convex pattern and has a shape other than the disc shape, such as a magnetic tape.

WORKING EXAMPLE 1

A magnetic recording medium 30 was manufactured in the manner described in the first exemplary embodiment. More specifically, the recording layer 32 was formed in the following concavo-convex pattern.

| | |
|---|---|
| Pitch: | 150 nm |
| Width of a convex portion: | 95 nm |
| Width of a concave portion: | 55 nm |
| Step between the convex portion and the concave portion: | 20 nm |

Then, in the non-magnetic material filling step (S104), the non-magnetic material 36 was deposited to have a thickness of approximately 40 nm under the following conditions, thereby filling the concave portions 34 with the non-magnetic material 36. Please note that the above-described thickness of the non-magnetic material 36 is a distance between the highest projecting portion of the surface of the deposited non-magnetic material 36 and the upper surface of the recording layer 32.

| | |
|---|---|
| Input power: | 500 W |
| Ar gas pressure: | 0.3 Pa |
| Bias power: | 250 W |

Next, in the flattening step (S106), the conditions were set in the following manner and the non-magnetic material 36 was removed to the upper surface of the recording elements 32A. The etching rate of the non-magnetic material 36 ($SiO_2$) was approximately 46 Å/min. In this removal, it is considered that the upper surface of the recording elements 32A was also processed by ion beams slightly. However, under the same conditions, the etching rate of the recording element 32A is approximately 15 Å/min. This value is less than $1/3$ of the etching rate of the non-magnetic material 36 ($SiO_2$) and is a level at which the processed amount can be controlled to be 1 nm or less.

| | |
|---|---|
| Flow rate of Ar gas: | 11 sccm |
| Gas pressure: | 0.05 Pa |
| Beam voltage: | 500 V |
| Beam current: | 500 mA |
| Suppressor voltage: | 400 V |
| Incident angle of ion beams: | +2° |

After the flattening step (S106), the surfaces of the recording layer 32 and the non-magnetic material 36 were observed with AFM (Atomic Force Microscope) and their cross sections were observed with TEM (Transmission Electron Microscope). The observation results are as follows. After the flattening step, the non-magnetic material 36 was not left above the recording elements 32A. Please note that a mean step shown below is a mean step between the upper surface of the recording elements 32A and the upper surface of the non-magnetic material 36.

| | |
|---|---|
| Processed amount of the recording layer: | 0.3 nm |
| Mean step: | 0.7 nm |

The magnetic characteristics of the recording layer were measured with VSM (Vibrating Sample Magnetometer). No degradation of the magnetic characteristics was found.

WORKING EXAMPLE 2

In the manner described in the second exemplary embodiment, $C_2F_6$ (hexafluoroethane) gas was used as the processing gas in the flattening step (S106). The other steps were the same as those in Working Example 1. The conditions in the flattening step (S106) were set as follows.

| | |
|---|---|
| Flow rate of $C_2F_6$ gas: | 6 sccm |
| Gas pressure: | 0.05 Pa |
| Beam voltage: | 500 V |
| Beam current: | 500 mA |
| Suppressor voltage: | 400 V |
| Incident angle of ion beams: | +2° |

The etching rate of the non-magnetic material 36 ($SiO_2$) in the flattening step (S106) was approximately 91 Å/min. It is considered that the upper surface of the recording element 32A was also processed by ion beams slightly. However, the etching rate of the recording element 32A is approximately 6.3 Å/min under the same conditions. This value is less than $1/14$ of the etching rate of the non-magnetic material ($SiO_2$) and is a level at which the processed amount can be controlled to be 1 nm or less. After the flattening step (S106), the surfaces of the recording layer 32 and the non-magnetic material 36 were observed with AFM and their cross sections were observed with TEM. The observation results are shown below. The non-magnetic material 36 was not left above the recording elements 32A.

| Processed amount of the recording layer: | 0.0 nm |
|---|---|
| Mean step: | 1.0 nm |

In addition, the magnetic characteristics of the recording layer were measured with VSM. No degradation of the magnetic characteristics was found.

As described above, in Working Example 2, the etching rate of the non-magnetic material 36 (SiO$_2$) was higher than that in Working Example 1 and the time required for flattening was shortened. Moreover, the processed amount of the recording layer was suppressed to be smaller than that in Working Example 1.

COMPARATIVE EXAMPLE 1

Unlike Working Example 1, the flattening step (S106) was performed while the incident angle of ion beams was set to approximately 90°, thereby completely removing the non-magnetic material 36 above the recording elements 32A. The other conditions were the same as those in Working Example 1. The etching rate of the non-magnetic material 36 in Comparative Example 1 was approximately 250 Å/min. Please note that the etching rate of the recording element 32A under the same conditions is approximately 310 Å/min.

After the flattening step (S106), the surfaces of the recording layer 32 and the non-magnetic material 36 were observed with AFM and their cross sections were observed with TEM. The observation results are shown below. The non-magnetic material 36 was not left above the recording elements 32A.

| Processed amount of the recording layer: | 2.6 nm |
|---|---|
| Mean step: | 0.6 nm |

In addition, when the magnetic characteristics of the recording layer were measured with VSM, it was found that they were largely degraded.

In Comparative Example 1, the mean step was slightly improved, as compared with Working Examples 1 and 2. However, a part of the recording elements 32A was removed and the upper surface of the recording elements 32A became lower than the upper surface of the non-magnetic material 36. Thus, in Comparative Working Example 1, there is concern that the magnetic characteristics of the recording elements 32A are degraded by processing and the recording and reproduction sensitivity is lowered by increase of the space between the recording elements 32A and a head.

On the other hand, in Working Examples 1 and 2, it was confirmed that a magnetic recording medium could be surely obtained in which the surface was sufficiently flattened and the recording elements 32A had good magnetic characteristics.

The present invention can be used for manufacturing a so-called patterned medium type magnetic recording medium in which a recording layer is formed in a concavo-convex pattern, such as a discrete track medium and a discrete bit medium.

What is claimed is:

1. A method for manufacturing a magnetic recording medium, comprising
    a non-magnetic material filling step of depositing a non-magnetic material of silicon oxide over a recording layer of cobalt-chromium alloy formed in a predetermined concavo-convex pattern over a substrate to fill a concave portion of the concavo-convex pattern with the non-magnetic material; and
    a flattening step of removing an excess part of the non-magnetic material above the recording layer by ion beam etching to flatten surfaces of the non-magnetic material and the recording layer,
    in the flattening step argon gas is used as a processing gas and an incident angle of ion beams with respect to a surface of the substrate is restricted within a range of from −10° to +30°.

2. The method for manufacturing a magnetic recording medium according to claim 1, wherein
    in the flattening step the incident angle of ion beams with respect to the surface of the substrate is restricted within a range of from −10° to +10°.

3. The method for manufacturing a magnetic recording medium according to claim 1, wherein
    the non-magnetic material filling step uses a deposition method that deposits the non-magnetic material while applying a bias power to the substrate.

4. A method for manufacturing a magnetic recording medium, comprising:
    a non-magnetic material filling step of depositing a non-magnetic material of silicon oxide over a recording layer of cobalt-chromium alloy formed in a predetermined concavo-convex pattern over a substrate to fill a concave portion of the concavo-convex pattern with the non-magnetic material; and
    a flattening step of removing an excess part of the non-magnetic material above the recording layer by ion beam etching to flatten surfaces of the non-magnetic material and the recording layer,
    in the flattening step hexafluoro-ethane gas is used as a processing gas and an incident angle of ion beams with respect to a surface of the substrate is restricted within a range of from −10° to +10°.

5. The method for manufacturing a magnetic recording medium according to claim 4, wherein
    the non-magnetic material filling step uses a deposition method that deposits the non-magnetic material while applying a bias power to the substrate.

* * * * *